United States Patent Office 3,801,664
Patented Apr. 2, 1974

3,801,664
STYRENE SEPARATION FROM ETHYLBENZENE
George C. Blytas, Houston, Tex., assignor to
Shell Oil Company
No Drawing. Filed Mar. 16, 1973, Ser. No. 342,114
Int. Cl. C07c 7/16
U.S. Cl. 260—669 A                    4 Claims

ABSTRACT OF THE DISCLOSURE

Styrene is separated from ethylbenzene in high yield and purity by a process which comprises (a) extraction with a two-phase solvent system in which the extracting phase is a concentrated anhydrous cuprous nitrate/propionitrile solution, wherein the styrene is selectively complexed with the cuprous ion, and the ethylbenzene counter solvent is a $C_5$–$C_{18}$ paraffin; (b) separation of the propionitrile solution phase containing the styrene-cuprous ion complex from the paraffin phase and (c) decomposing the styrene-cuprous ion complex to recover the styrene therefrom.

BACKGROUND OF THE INVENTION

Field of the invention

This invention relates to a dual solvent process for separating styrene from hydrocarbon mixtures made up essentially of styrene and ethylbenzene. More particularly, this invention is directed to a process for separation of styrene from ethylbenzene, which is accomplished by contacting the styrene/ethylbenzene mixture under anhydrous conditions with a two-phase solvent system employing a concentrated cuprous nitrate/propionitrile polar phase and a $C_5$–$C_{18}$ paraffin non-polar phase. The styrene is selectively distributed into the polar phase through complex formation with the cuprous ion and the ethylbenzene is solubilized into the non-polar phase.

All known processes for styrene manufacture which are in general commercial use employ ethylbenzene as the starting material or immediate precursor to the styrene product. In a large majority of these processes the ethylbenzene is catalytically dehydrogenated to afford the desired styrene product. Conventionally, the conversions of ethylbenzene to styrene obtained with these processes is far from complete (generally below 60%) although the selectivity at these low conversions is normally quite high (90% or better). Therefore, in normal occurences the dehydrogenation reaction product will contain substantial portions of styrene and ethylbenzene as well as minor amounts of reaction by-products and impurities such as benzene, toluene, light ends including hydrogen, methane and ethylene, and heavy ends. The separation of the styrene from the light ends, heavy ends, benzene and toluene is relatively easy, being accomplished by conventional distillations wherein the styrene containing phase is recovered as a bottoms product and subsequently as the overhead product. The separation of the styrene from the unreacted ethylbenzene presents a considerably more difficult problem due primarily to their close similarity in volatility. Conventionally, this final separation has been accomplished by multiple stage distillation under vacuum conditions in arge and sophisticated distillation columns due to the large number of theoretical plates required to affect a good separation. Even under these conditions a polymerization inhibitor is usually added because of the tendency of the product to polymerize at the time and temperature conditions required to affect the separation. Therefore, it is apparent that considerable incentive exists to develop alternative means of affecting this separation which could be more viable from either or both economic and ease of operation standpoints.

Description of the prior art

The separation of olefinically unsaturated hydrocarbons from hydrocarbons of lesser degrees of unsaturation with a solution of a cuprous salt is known in the art. For example, U.S. Pat. 3,401,112 to Dunlop et al., describes a process wherein an anhydrous solution of cuprous trifluoroacetate, as well as other fluoro- or oxy-cuprous salts, in a polar organic solvent such as propionitrile is employed. Additionally U.S. Pat. 3,449,240 to Blytas et al., describes a similar process employing an anhydrous solution of cuprous sulfate in propionitrile. In both of these processes an olefin is separated from a hydrocarbon mixture containing that olefin and close boiling, more saturated hydrocarbons by selectively forming an olefin-cuprous complex and subsequently separating and decomposing the complex. Both of these patents are directed primarily to separation of aliphatic hydrocarbons of differing degrees of olefinic unsaturation, although U.S. 3,401,112 does propose separation of benzene from cyclohexene and other hexanes.

The use of a paraffin countersolvent in combination with a cuprous ion (cuprous trifluoroacetate) in propionitrile solution to separate an olefinically unsaturated hydrocarbon from a hydrocarbon of a lesser degree of unsaturation has also been proposed in U.S. Pat. 3,546,106 to Blytas. However, in this process the olefin is first extracted into the cuprous trifluoroacetate/propionitrile solution as a single phase extraction medium and the resulting propionitrile solution containing the olefin-cuprous complex is subsequently contacted with the paraffin countersolvent whereby the olefin is liberated from the cuprous complex and extracted into the paraffin phase.

SUMMARY OF THE INVENTION

It has now been found that styrene can be separated and recovered in high yield and purity from hydrocarbon mixtures containing styrene and ethylbenzene by a multi-step process. The first step comprises intimately contacting the hydrocarbon mixture containing styrene and ethylbenzene with a two-phase solvent system wherein the polar phase is an anhydrous cuprous nitrate/propionitrile solution containing 15 to 26% by weight cuprous ion and 2 to 5% by weight cupric ion and the non-polar phase is a $C_5$–$C_{18}$ paraffin. The styrene is selectively extracted into the polar phase by formation of a styrene-cuprous complex and the ethylbenzene is solubilized by, and distributed into, the non-polar phase. The second step comprises separating the polar phase containing the styrene-cuprous complex from the non-polar phase containing the ethylbenzene. Finally, the styrene cuprous-ion complex is decomposed to recover the styrene therefrom.

This invention is based on the finding that anhydrous cuprous nitrate/propionitrile solutions having cuprous ion concentrations in the above-defined range exhibit very high volume capacity for styrene through styrene-cuprous complex formation whereas their capacity for ethylbenzene is quite limited. This phenomenon is a clear contrast with findings made with cuprous trifluoroacetate/propionitrile solutions under similar conditions showing ethylbenzene to be completely miscible with the propionitrile solution. Moreover, the volume capacities of the concentrated anhydrous cuprous nitrate/propionitrile solutions of this invention for styrene and ethylbenzene are such that when the propionitrile solution is employed as the polar phase of a two-phase extraction medium, with the other phase being a $C_5$–$C_{18}$ paraffin, very high selectivities for extraction of the styrene from ethylbenzene can be achieved while maintaining the total solvent requirements at a minimum. In fact, the extraction selectivities and solvent volume requirements of the process of the instant invention are such that steps (1)

and (2) of the process can be performed in a single step, continuous manner using conventional countercurrent extraction procedures and equipment. Under these conditions the process of the instant invention provides a viable alternative to the conventional vacuum distillation separation for styrene/ethylbenzene mixtures. The process as hereinbefore described wherein step (1) and (2) are performed as a single step in a continuous manner forms a preferred aspect of this invention.

DESCRIPTION OF THE PREFERRED EMBODIMENTS

The solvent extraction system

The solvent extraction system employed in the process of the invention is a two-phase system wherein the polar phase is an anhydrous cuprous nitrate/propionitrile solution containing 15 to 26% by weight cuprous ion and 2 to 5% by weight cupric ion, and the nonpolar phase is a paraffinic hydrocarbon of 5 to 18 carbon atoms. While for convenience the solvent system is herein referred to as an extraction system, the propionitrile solution polar phase can be more accurately described as an extraction-complexing phase. This is because the propionitrile solution, having the high concentrations of dissolved cuprous ion as hereinbefore described, absorbs and dissolves styrene through the mechanism of chemically complexing the olefinic double bond of the styrene molecule with the dissolved cuprous ion. It is the unusually high capacity which the concentration cuprous nitrate/propionitrile solutions of the inventions have for complexing and dissolving styrene coupled with their low solvency for ethylbenzene which forms the basis of this invention.

The concentrated cuprous nitrate/propionitrile solutions, employed as the polar phase of the two-phase extraction solvent of this invention, have heretofore been unknown in the prior art. Nor, moreover, can cuprous nitrate/propionitrile solutions, containing the high concentrations of cuprous ion and correspondingly low concentrations of cupric ion as described above, be prepared by conventional methods known to the art. The concentrated cuprous nitrate/propionitrile solutions employed in this invention and their preparation are the subject of applicant's copending application Ser. No. 342,115, common assignee, filed Mar. 16, 1973. The disclosure of this copending application is herewith incorporated by reference. Briefly, the concentrated cuprous nitrate/propionitrile solutions employed in this invention are prepared by a two-step process which comprises the steps of (1) contacting, under anhydrous conditions, stoichiometric quantities of cupric nitrate and metallic copper sufficient to yield on complete reduction of the copper no more than about 4% cuprous ion in propionitrile solution at elevated temperatures to produce a dilute propionitrile solution wherein the copper is present substantially in the cuprous form, and (2) removing a portion of the propionitrile solvent to obtain the concentrated solution. In the first step of this preparation process substantial conversions of cupric nitrate and metallic copper to cuprous nitrate are obtained by heating the copper to cuprous nitrate are obtained by heating the dilute propionitrile solution at temperatures in the range of about 50 to 120° C. for periods of time ranging from 0.5 to 50 hours, the reaction time being inversely related to the reaction temperature. Preferably, the reaction is conducted in refluxing propionitrile solvent (ca. 100° C.) for periods of time ranging from 1 to 8 hours. At a reaction temperature and reaction times within this preferred range, conversions of cupric nitrate and metallic copper to cuprous nitrate ranging from 65 to 95% are readily obtainable. In the second step of the process the concentration may be accomplished by any conventional procedure by which a controlled quantity of propionitrile solvent can be removed from the solution—e.g., overhead distillation of the propionitrile at atmospheric or superatmospheric pressures, distillation in a vacuum and the like—provided heating of the solution for extended periods above 110° C. is avoided.

The concentrated anhydrous cuprous nitrate/propionitrile solutions employed in this invention, as prepared by the process described in the applicant's copending application Ser. No. 342,115, common assignee, filed Mar. 16, 1973, contain concentrations of cuprous ion ranging from about 15 to 26% by weight and cupric ion concentrations ranging from about 2 to 5% by weight. Preferably, the anhydrous cuprous nitrate/propionitrile solutions employed in the instant invention contain cuprous ion concentrations ranging from about 20 to 26% by weight and cupric ion concentrations ranging from about 3 to about 4.5% by weight.

The paraffinic hydrocarbons employed as the non-polar phase of the two phase solvent extraction system of the instant invention are saturated alicyclic hydrocarbons of from 5 to 18 carbon atoms. These hydrocarbons may be of branched- or straight-chain structure and may be employed as single component solvents or as mixture. Preferably, the saturated alicyclic hydrocarbon solvent is of straight-chain structure and contains from 6 to 14 carbon atoms.

The ratio of the amount of propionitrile solution to paraffin solvent which makes up the two-phase solvent system of this invention is dependent on a number of factors including the relative proportions of styrene and ethylbenzene in the styrene/ethylbenzene mixtures to be extracted, whether the extraction is to be conducted batchwise or in a continuous manner, the extent to which the styrene is to be recovered, the desired purity of the recovered styrene and the number of mixing and extraction stages to be employed. Therefore, the ratio of propionitrile solution to paraffin solvent in the two-phase solvent extraction system may vary over wide limits which may be readily ascertained by those skilled in the art as being dependent on factors such as those described above. In any case, there as certain maximum volume ratios of propionitrile solution to paraffin solvent and vice versa which are necessary to achieve reasonable phase separation in conventional equipment. These maximum volume ratios are suitably 4:1 propionitrile solution to paraffin solvent and 4:1 paraffin solvent to propionitrile solution. In a large majority of conventional styrene manufacturing processes employing catalytic dehydrogenation of ethylbenzene, the reaction product after removal of light and heavy ends will contain about 30–50% styrene and about 50–70% ethylbenzene. For application to separation of styrene from styrene/ethylbenzene mixtures containing styrene and ethylbenzene in the proportions described by these ranges, the two phase extraction system of this invention is suitably employed at propionitrile solution to paraffin solvent volume ratios of 3:1 to 1:1. In a preferred aspect of the process of the invention, described below, wherein the contacting and phase separation steps of the process are performed in a single volume ratios of propionitrile solution to paraffin solvent for extraction of the same styrene-ethylbenzene mixtures preferably range from 1.5:1 to 2.5:1.

The process

In the most basic terms the process of the invention comprises (a) contacting mixtures of styrene and ethylbenzene with the cuprous nitrate in propionitrile solution/paraffin two-phase solvent extraction system of the invention whereby the styrene is selectively extracted into the propionitrile solution polar phase by complex formation with the dissolved cuprous ion and the ethylbenzene is dissolved by, and extracted into, the paraffin nonpolar phase (b) separting the polar phase containing the styrene-suprous complex from the nonpolar phase containing the ethylbenzene (c) decomposing the styrene-cuprous ion complex to recover the styrene.

In the contacting step (step (a)) the ratio of the amount of cuprous nitrate-propionitrile solution to the styrene-ethylbenzene mixture is dependent on the concentration of the cuprous salt solution and the proportion of styrene in the mixture. Generally, a molar excess of cuprous salt is employed with molar ratios of cuprous salt to styrene of from about 1.1:10 being suitable. When the cuprous salt solution is within the preferred concentration and the proportion of styrene in the styrene-ethylbenzene mixture falls within the range conventionally found in styrene reaction products prepared by catalytic dehydrogenation of ethylbenzene (30–50%, see above), molar ratios of cuprous salt to styrene of from about 1.5:1 to about 3:1 are preferred.

Both the contacting step and the subsequent separation step (steps (a) and (b)) may be carried out using conventional equipment in either a batchwise or continuous manner, for example, the contacting and separation steps may be carried out batchwise in a plurality of phase separation vessels connected in series such that the phases which separate from the initial extraction can be subject to one or more additional extractions as are necessary to achieve the desired recovery and/or purity. In such a case, the phase separation vessels should be equipped with a means for mixing so that intimate contact between the styrene-ethylbenzene mixture and the two phase solvent extraction system can be achieved. In any case, when batchwise procedures are employed, the order and manner in which the styrene-ethylbenzene mixture and the polar and nonpolar phases of the solvent extraction system are combined are wholly conventional—i.e., the two phases of the solvent extraction system are added separately or as a two phase system before or after the styrene-ethylbenzene mixture is charged to the first phase separation vessel. Preferably, the contacting and separation steps are carried out in a continuous, single step operation in any suitable apparatus such as a series of separate but connected mixers and settlers or a rotating disc contactor. Preferred contacting apparatus permits intimate contacting of the styrene-ethylbenzene mixture by the cuprous nitrate/propionitrile solution polar phase and the paraffin nonpolar phase while effecting countercurrent passage of the polar and nonpolar phases relative to each other. In order to promote intimate of the styrene-ethylbenzene mixture with the two phase solvent extraction sysem it is generally advisable to provide a contacting zone having a plurality of mixing stages. Although the actual number of theoretical mixing stages required is dependent on the degree of separation being effected, that is, the product purity and recovery desired, generally, contacting zones of at least about 5 theoretical mixing stages are suitable with zones having at least about 10 theoretical mixing stages being generally preferred. The concept "theoretical mixing stage" makes it possible to indicate more precisely the character of the flow through the contacting zone. A zone is said to have "$n$" theoretical mixing stages if the spread of the residence time of the volume of the stream supplied is equal to that of "$n$" ideal mixers connected in series. In an ideal mixer the composition of its contents is uniform. Any known procedure available for creating a plurality of mixing stages in the contacting zone may be used. Particularly preferred is the use of an upright cylindrical contactor containing a plurality of annular stationary baffles in which a substantially axially positioned stirring device with spaced-apart parallel rotating discs is present, as described, for example in U.S. Pat. 2,601,674 and in "Chemical Engineering Progress," vol. 51 (1955), pp. 141–146. Such apparatus, which is conventionally referred to as a rotating disc contactor, not only provides continuous thorough contacting but also effects separation of the praffin phase containing the ethylbenzene from the styrene-cuprous complex containing propionitrile phase When a vertical rotating disc contactor is employed to affect the contacting and separation steps of the process the cuprous nitrate/propionitrile solution polar phase, the paraffin nonpolar phase and the styrene-ethylbenzene mixture are charged to the top, bottom and middle of the vertical contactor, respectively in a manner such that about 2 to 6 theoretical mixing stages are present above the styrene-ethylbenzene inlet and about 3 to 10 theoretical mixing stages are present below the styrene-ethylbenzene inlet. In this system the propionitrile solution containing the styrene-cuprous complex and the paraffin containing the ethylbenzene are continuously removed as bottoms and tops products, respectively.

The contacting and separation steps may be carried out at temperatures below about 110° C. at which the styrene-ethylbenzene and paraffin are liquid. Higher temperatures result in undesirable decomposition losses of cuprous salts, and styrene loses through polymerization. Preferred temperatures are between about 20° C. and about 50° C.

After phase separation, the styrene-cuprous ion complex in the propionitrile solution can be decomposed and the styrene can be recovered by distillation of the styrene-cuprous complex containing solution, or alternatively, by ligand exchange with a $C_{10}$ to $C_{14}$ olefin. Recovery of the styrene by distillation can be accomplished by vapor stripping at about 100° C. into a fractional distillation column which separates the more volatile propionitrile from the overheaded styrene. Under these conditions polymerization of styrene is minimal since cuprous/cupic ion systems are known to inhibit styrene polymerization. The recovery of styrene from the styrene-cuprous complex in propionitrile solution by ligand exchange involves the use of a liquid/liquid contacting procedure wherein the propionitrile solution is intimately contacted with molar excesses of a $C_{10}$ to $C_{14}$ olefin countersolvent thereby liberating the styrene from the complex by displacement of complexed styrene ligands with olefins ligands. The free styrene is extracted into the olefin, from which it is subsequently recovered by conventional methods such as distillation. The liquid/liquid contacting step may be effected by any suitable apparatus. Apparatus which provides a contacting zone comprising a plurality of theoretical mixing stages is advisable. Particularly, preferred apparatus is a vertical rotating disk contactor of from 3 to 8 theoretical mixing stages wherein the propionitrile solution is charged to the top of the contactor and the olefin is added at the bottom of the contactor. Such apparatus in this service not only provides thorough contacting but also effects separation of the countersolvent-styrene phase from the cuprous nitrate/propionitrile solution.

The contacting and separation may be carried out at temperatures below about 100° C. at which the styrene and monoolefin countersolvent are liquid, with temperatures of between 50° C. and about 80° C. being preferred.

ILLUSTRATIVE EMBODIMENT I

The preparation of concentrated cuprous nitrate/propionitrile solutions by reduction of cupric nitrate with metallic copper in propionitrile solvent was caried out in a series of runs employing different initial concentrations of cupric nitrate and metallic copper. The procedure followed in all runs involved adding measured amounts of anhydrous cupric nitrate and metallic copper to anhydrous propionitrile solvent under an inert nitrogen atmosphere followed by a reaction period wherein the reaction mass was heated to reflux (98° C.) for varying periods of time. Samples of the reaction mass were withdrawn at periodic intervals through the reflux period for analysis to check the extent of conversion. The reflux period was continued until either substantial conversion of reactants to cuprous nitrate was obtained or until such time that significant further conversion appeared improbable. The results of these runs are listed in Table I below wherein the reactant charge is shown as the initial concentration, in percent by weight of total solution, of cupric ion and copper metal and the percent conversion to cuprous ion is based on the percent of available copper metal which has reacted.

TABLE I

| Run number | Initial concentration in propionitrile solution | | Time (hrs.) at reflux conditions | Percent conversion to Cu+ |
|---|---|---|---|---|
| | Cu++ | Cu° | | |
| 1 | 1.25 | 1.25 | 2 | 85 |
| 2 | 1.28 | 1.28 | 2 | 70 |
| 3 | 2.50 | 2.50 | 10 | 30 |
| 4 | 2.50 | 2.50 | 48 | 50 |
| 5 | 5.1 | 5.1 | 24 | 52 |

The dilute cuprous nitrate/propionitrile solution prepared in run number 1, Table I, was subsequently concentrated by distillation in a vacuum to terminal conditions of 40 mm. Hg and 50° C. to yield a saturated cuprous nitrate/propionitrile solution containing 26% by weight cuprous ion and 4.5% by weight cupric ion.

ILLUSTRATIVE EMBODIMENT II

Utilizing cuprous nitrate/propionitrile solutions prepared according to the procedure described in embodiment I, the solubility of styrene and ethylbenzene in the concentrated cuprous nitrile/propionitrile solutions of this invention were determined. For comparison, the solubility of styrene and ethylbenzene in a cuprous trifluoroacetate/propionitrile solution of similar cuprous ion concentration was also determined. This cuprous trifluoroacetate solution was prepared by the general procedure described in U.S. Pat. 3,401,112 to Dunlop et al. In carrying out the solubility determinations weighted amounts of styrene and ethylbenzene were added incrementally to measured quantities of the given solvents. The solubility limit was set where first signs of phase separation were apparent to visual observation. The results of the determinations are given in Table II below.

TABLE II

| Cuprous salt/propionitrile solution employed | Percent/ wt. Cu (I) | Solubility | |
|---|---|---|---|
| | | G. ethylbenzene/ 100 g. solvent | G. styrene/ 100 g. solvent |
| Cuprous nitrate [1] | 22 | 18 | Completely miscible |
| Do.[1] | 26 | 13.7 | Do. |
| Cuprous trifluoroacetate [2] | 19 | ([3]) | Do. |

[1] Solubility determined at 40° C.
[2] Solubility determined at 50° C.
[3] Completely miscible.

ILLUSTRATIVE EMBODIMENT III

The extraction selectivity for styrene from mixtures of styrene and ethylbenzene were determined using cuprous nitrate/propionitrile solutions (CuNO$_3$/EtCN) containing about 22% by weight cuprous ion with normal paraffin countersolvents. For comparison, extraction selectivities for cuprous trifluoroacetate/propionitrile (CuTFA/EtCN) normal paraffin systems were also determined under a similar test condition. The experimental procedure utilized in determining selectivities for styrene/ethylbenzene separation involved contacting 10 to 15 grams of the cuprous ion containing solution with 2 to 10 grams of the paraffinic countersolvent and the appropriate amount of styrene and ethylbenzene (added as a mixture containing 40% by weight styrene and 60% by weight ethylbenzene) in a nitrogen-blanketed glass container. The glass container was covered with a serum cup, and shaken in a thermostat for over 30 minutes, though equilibration was essentially complete in much shorter times, e.g., about 5 minutes. The composition of the two phases was determined by withdrawing samples through the serum cup and analyzing by gas liquid chromatography. The results of the tests including a compilation of the styrene/cuprous ion molar ratios employed are given in Table III below.

TABLE III

| Solvent | Countersolvent | Temp., °C. | Styrene/ Cu (I) molar ratio | Percent wt. paraffin in nonpolar phase | Selectivity β[1] |
|---|---|---|---|---|---|
| CuNO$_3$/EtCN 22% wt. Cu (I).[2] | n-Tetradecane | 25 | 0.44 | 80.2 | 6.8 |
| | do | 50 | 0.44 | 72.2 | 4.3 |
| | do | 25 | 0.36 | 81.6 | 7.3 |
| | do | 50 | 0.36 | 87 | 7.6 |
| | do | 40 | 0.61 | 62 | 4 |
| | do | 40 | 0.52 | 67 | 4.2 |
| | do | 40 | 0.2 | 91 | 11.5 |
| | do | 40 | 0.1 | 93.6 | >50 |
| | n-Heptane | 40 | 0.16 | 88 | 14.4 |
| | do | 40 | 0.53 | 59 | 5.7 |
| | do | 40 | 0.5 | 67 | >7 |
| CuTFA/ETCN 19% wt. Cu (I).[2] | n-Tetradecane | 50 | 0.2 | 91 | 7.5 |
| | do | 50 | 0.5 | 67 | <2 |
| | do | 50 | 0.44 | 72.2 | 2.7 |
| | do | 50 | 0.36 | 87 | 5.3 |
| | do | 50 | 0.61 | 62 | <2.1 |
| | n-Decane | 50 | 0.2 | 85 | 5.7 |
| | do | 50 | 0.5 | 85 | 2 |

[1] Selectivity, β=Percent styrene in polar phase, percent styrene in nonpolar phase/percent ethylbenzene in polar phase, percent ethylbenzene in nonpolar phase.
[2] Saturated solution at room temperature.

The data given in the table demonstrate that at equal temperatures (50° C.), styrene/Cu(I) molar ratios (0.36 and 0.44) and countersolvent concentrations in the nonpolar phase (72 to 86%) the selectivities of the cuprous nitrate system are 40 to 60% higher than those of the cuprous trifluoroacetate system. Also the selectivities at low styrene/Cu(I) molar ratios are considerably higher in the cuprous nitrate/propionitrile system. This means that higher purities of styrene can be obtained with fewer extraction stages.

I claim as my invention:

1. A process for separating styrene from hydrocarbon mixtures containing styrene and ethylbenzene which comprises the steps of (1) intimately contacting the hydrocarbon mixture containing styrene and ethylbenzene with a two-phase solvent system wherein the polar phase is an anhydrous cuprous nitrate/propionitrile solution containing 15 to 26% by weight cuprous ion and 2 to 5% by weight cupric ion and the nonpolar phase is a $C_5$-$C_{18}$ paraffin thereby selectively extracting the styrene into the polar phase through formation of a styrene-cuprous complex and solvating the ethylbenzene into the nonpolar phase (2) separating the polar phase containing the styrene-cuprous complex from the nonpolar phase containing the ethylbenzene (3) decomposing the styrene cuprous-ion complex to recover the styrene therefrom.

2. The process of claim 1 wherein the anhydrous cuprous nitrate/propionitrile solution contains cuprous ion concentrations ranging from about 20 to 26% by weight and cupric ion concentrations ranging from about 3 to 4.5% by weight.

3. The process of claim 1 wherein the steps (1) and (2) are carried out at temperatures between about 20° C. and about 60° C.

4. The process of claim 3 wherein steps (1) and (2) are carried out as a single step in a continuous manner wherein the styrene-ethylbenzene mixture is intimately contacted by the cuprous nitrate/propionitrile polar phase and the paraffin nonpolar phase during countercurrent passage of the polar and nonpolar phases relative to each other.

References Cited
UNITED STATES PATENTS

| | | | |
|---|---|---|---|
| 2,973,394 | 2/1961 | Atkinson | 260—669 A |
| 3,634,530 | 1/1972 | Bills | 260—669 A |

CURTIS R. DAVIS, Primary Examiner

U.S. Cl. X.R.

260—674 WC